March 4, 1924.
C. A. HARTMANN
MOTOR VEHICLE DEFLECTOR DEVICE
Filed Dec. 28, 1922    3 Sheets-Sheet 2
1,485,777
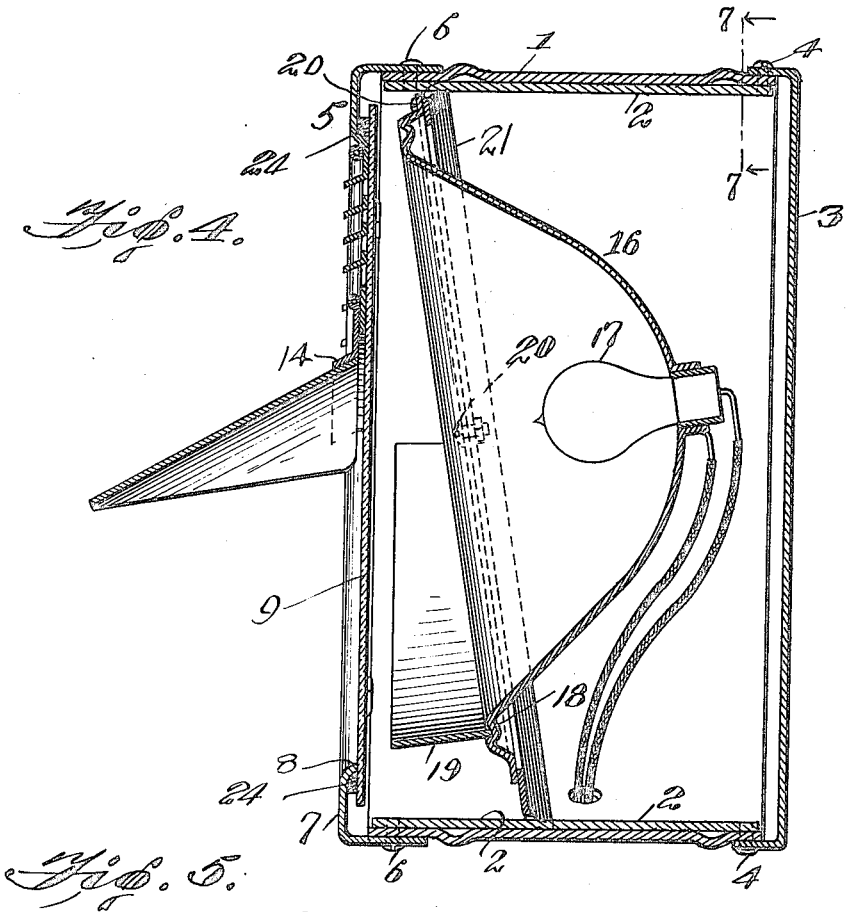
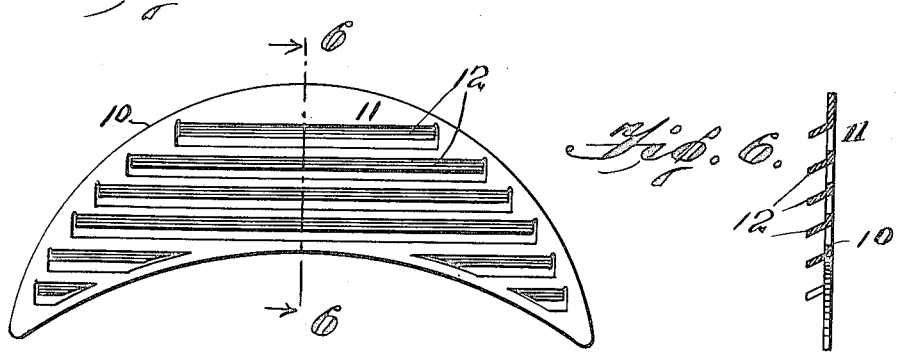
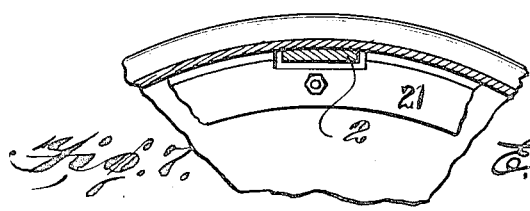
INVENTOR.
Charles A. Hartmann.
BY
ATTORNEYS.

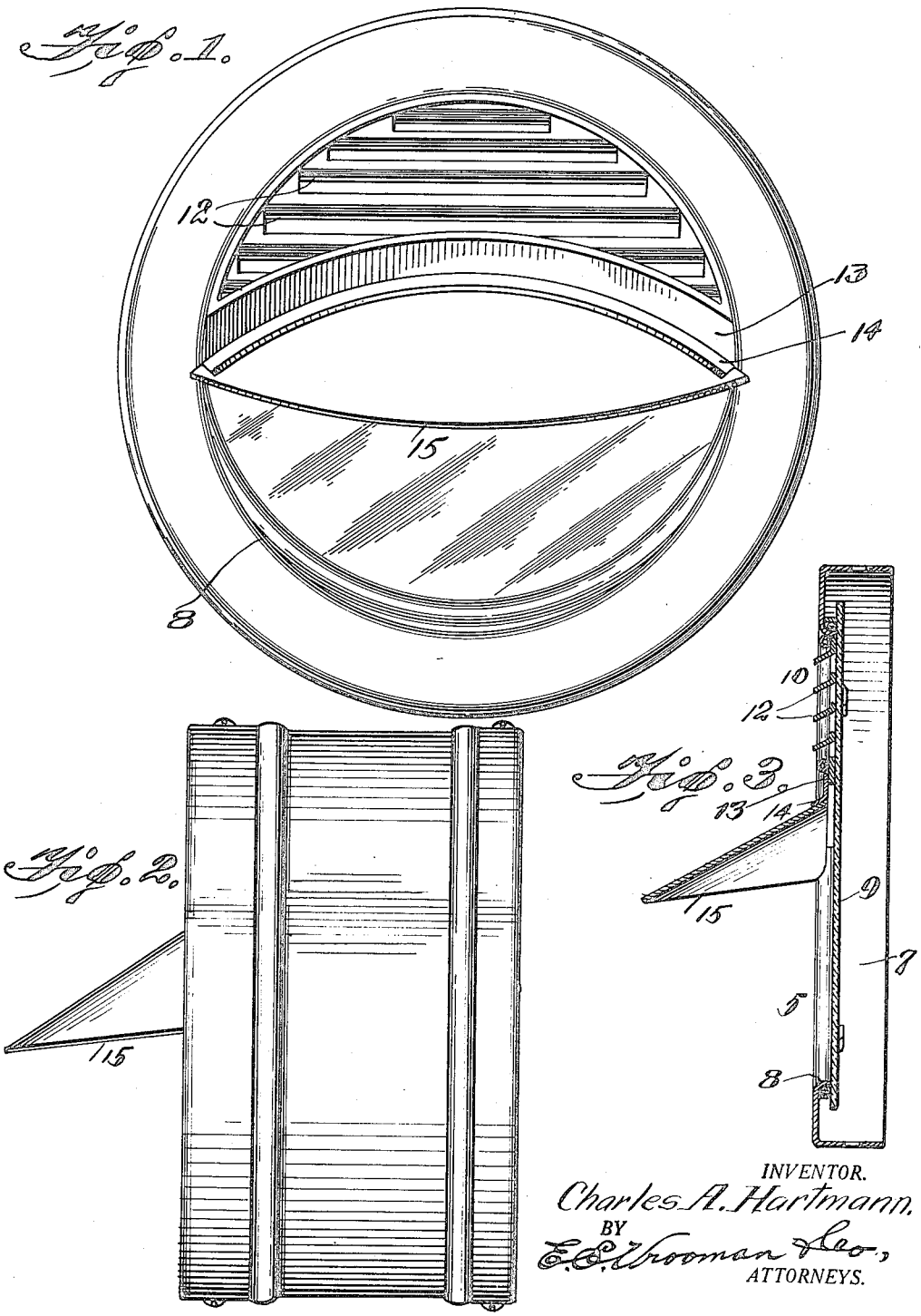

March 4, 1924.
C. A. HARTMANN
1,485,777
MOTOR VEHICLE DEFLECTOR DEVICE
Filed Dec. 28, 1922   3 Sheets-Sheet 3
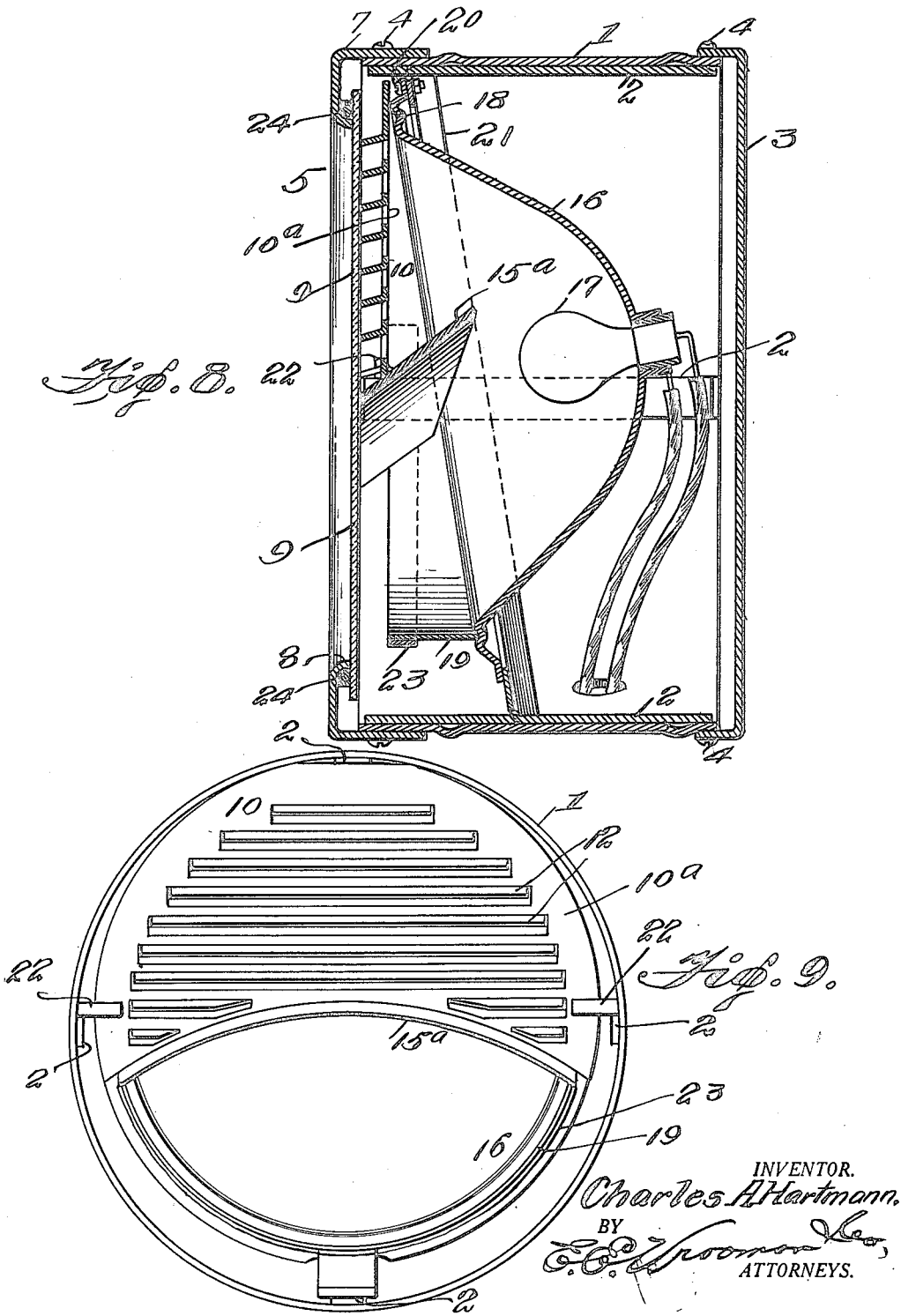

Patented Mar. 4, 1924.

1,485,777

UNITED STATES PATENT OFFICE.

CHARLES A. HARTMANN, OF SAN ANTONIO, TEXAS.

MOTOR-VEHICLE DEFLECTOR DEVICE.

Application filed December 28, 1922. Serial No. 609,442.

*To all whom it may concern:*

Be it known that I, CHARLES A. HARTMANN, a citizen of the United States, residing at San Antonio, in the county of Bexar and State of Texas, have invented certain new and useful Improvements in Motor-Vehicle Deflector Devices, of which the following is a specification, reference being had therein to the accompanying drawings.

This invention relates to a motor vehicle headlight, and the object of the invention is the provision of simple and efficient means, in a headlight, for deflecting the light or rays upon the roadway.

With this and other objects in view, my invention comprises certain novel combinations, constructions and arrangements of parts as will be hereinafter described, illustrated in the accompanying drawings, and more particularly pointed out in the appended claims.

In the drawings:

Figure 1 is a view in front elevation of a device constructed in accordance with the present invention, while Figure 2 is a view in side elevation of the same.

Figure 3 is a vertical, sectional view of the front section of the device.

Figure 4 is a longitudinal, sectional view of the entire device.

Figure 5 is a view in elevation of the shutter device, while

Figure 6 is a sectional view taken on line 6—6, Fig. 5, and looking in the direction of the arrows.

Figure 7 is a sectional view taken on line 7—7, Fig. 4, and looking in the direction of the arrows.

Figure 8 is a longitudinal, sectional view of the preferred embodiment of the entire device, similar in all particulars to the device shown in Fig. 4, except in the shutter device structure and the hood.

Figure 9 is a fragmentary front view of the device shown in Fig. 8, showing the shutter device and the hood.

Referring to the drawings by numerals, the headlight device comprises an outer casing 1, having horizontal bracing strips 2. A rear cap 3 is placed upon the rear end of the outer casing 1 and is held in position by screws 4. The front section 5 is placed upon the front end of casing 1 and is held in place by screws 6.

The front section 5 comprises a cap-like body 7 having a rolled edge 8. Against the inner edge or rolled edge 8 is secured a piece of transparent material 9, such as glass or the like. A shutter device 10 is employed, comprising a body 11 of sheet-metal from which is punched or cut the slats 12; each slat 12 is bent outwardly and downwardly at an angle for properly throwing the rays down upon the roadway, and these slats are preferably of the number and are positioned as shown clearly in the drawings.

Secured to the lower edge of the shutter device 10 is a curved strip 13 which is provided with a flange 14, and to the under face of flange 14 is secured the "bill" or hood 15. This hood 15 causes the rays to be thrown downwardly upon the road-bed, to a considerable distance in front of the vehicle upon which the device may be mounted.

The reflector 16 is placed in the casing 1, and is tilted at an angle for materially assisting in throwing the rays from the lamp 17 downward upon the roadway. The reflector 16 is provided on its outer edge with an annular grooved portion 18, in which grooved portion 18 is seated the inner end of the auxiliary reflector 19. This auxiliary reflector 19 (Figs 4 and 8) assists in throwing the rays in proper position in advance of the motor vehicle upon which my headlight is mounted. The reflector 16 is detachably secured, by bolts 20, to the annular, inclined, flanged device 21 in casing 1.

Referring to my preferred embodiment shown in Figs. 8 and 9: The general structure of the device shown in these figures is the same as hereinbefore described except that the shutter device 10$^a$ is slightly different (as hereinafter described), and is placed between the glass 9 and the reflector 16. The shutter device 10$^a$ comprises the body 10 with the outwardly and downwardly extending slats 12. On the opposite sides of the body 10 are fastened outwardly extending lugs 22, which lugs (Fig. 9) rest upon two of the longitudinally extending reinforcing strips 2. It will, therefore, be seen that strips 2 perform three functions; to wit: brace the casing 1, afford a better seat for screws 4 and 6, and provide a suitable support for the shutter device. A hood 15$^a$ is fastened in an inclined position to the lower edge of body 10 and this hood is highly polished and efficiently directs the rays from lamp 17 downwardly upon the ground or road. The auxiliary reflector 19 is provided with a reinforcing strip 23, at its front edge as shown in Fig. 8.

Bearing against the inner face of the rolled edge 8 is a piece of fabric 24 which acts as a cushion against which the glass 9 bears. The glass and reflectors 16 and 19 hold the shutter device 10$^a$ and hood 15$^a$ in position, inasmuch as the front edge of the auxiliary reflector 19 presses against the back of the shutter device, so likewise does the upper portion of the reflector 16, as clearly shown in Fig. 8.

While I have described the preferred embodiments of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a device of the class described, the combination of a casing, an inclined reflector in said casing, and an auxiliary reflector secured to said first-mentioned reflector and extending forwardly therefrom and partially about the same.

2. In a device of the class described, the combination of a casing, an annular inclined flanged device in said casing, a reflector provided with an annular grooved portion detachably secured to said annular flanged device, and a curved auxiliary reflector secured in the grooved portion of said first-mentioned reflector.

3. In a device of the class described, the combination of a casing, an annular flanged device positioned in an inclined position within said casing, a reflector provided with a groove on its outer edge and engaging said annular flanged device, means detachably securing said reflector to said annular flanged device, and an auxiliary reflector secured at its inner edge in said grooved portion of the first-mentioned reflector.

4. In a device of the class described, the combination with a casing, of a reflector in said casing, a front section on said casing, said front section comprising a cap-like body, a lens in said body, a shutter device mounted adjacent said lens and provided with light openings, and a light deflecting hood positioned beneath the shutter device and provided with an upstanding mounting flange secured to said shutter device.

5. In a device of the class described, the combination with a casing, a reflector within said casing, of a front section on said casing, said front section comprising a cap-like body, a transparent piece positioned extending longitudinally in and strips fastened to said casing, a shutter device behind said transparent piece, and lugs on said shutter device resting on certain of said strips to support the shutter device in operative relation to the reflector and transparent piece.

6. In a device of the class described, the combination with a casing, of strips in said casing, a front section on said casing, said front section comprising a cap-like body provided with a rolled front edge, a transparent piece positioned against said front rolled edge, a shutter device behind said transparent piece, horizontal lugs extending from opposite sides of said shutter device and resting upon some of said strips, an inclined hood secured to the bottom of said shutter device, and a primary and an auxiliary reflector in said casing having portions bearing against the shutter device for holding the same snugly against the transparent piece, substantially as shown and described.

In testimony whereof I hereunto affix my signature.

CHARLES A. HARTMANN.